April 21, 1970     R. C. PARSONS     3,507,968
ELECTROSLAG MELTING APPARATUS
Original Filed Dec. 27, 1966     6 Sheets-Sheet 1
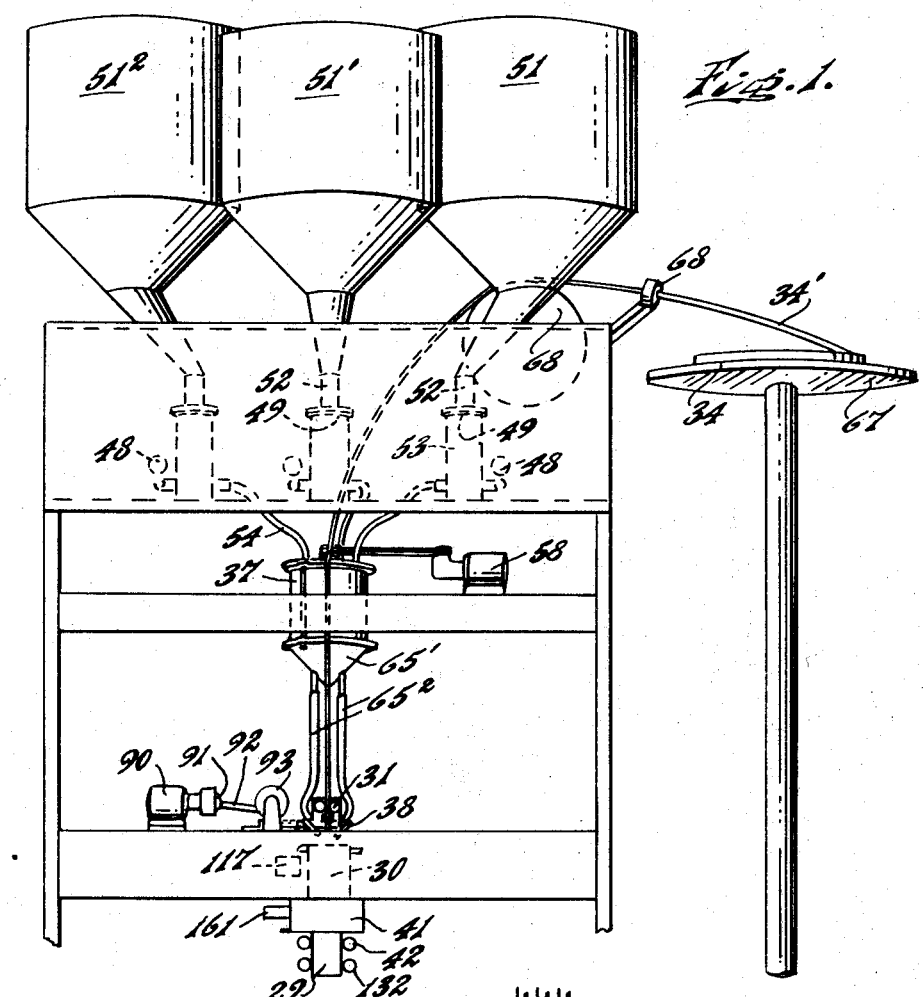
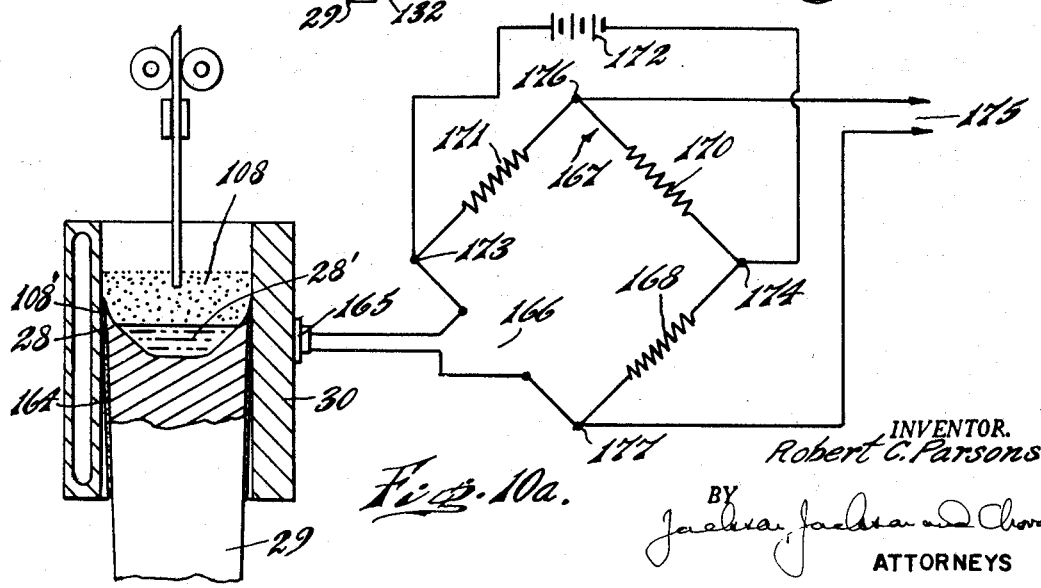
INVENTOR.
Robert C. Parsons
BY
ATTORNEYS

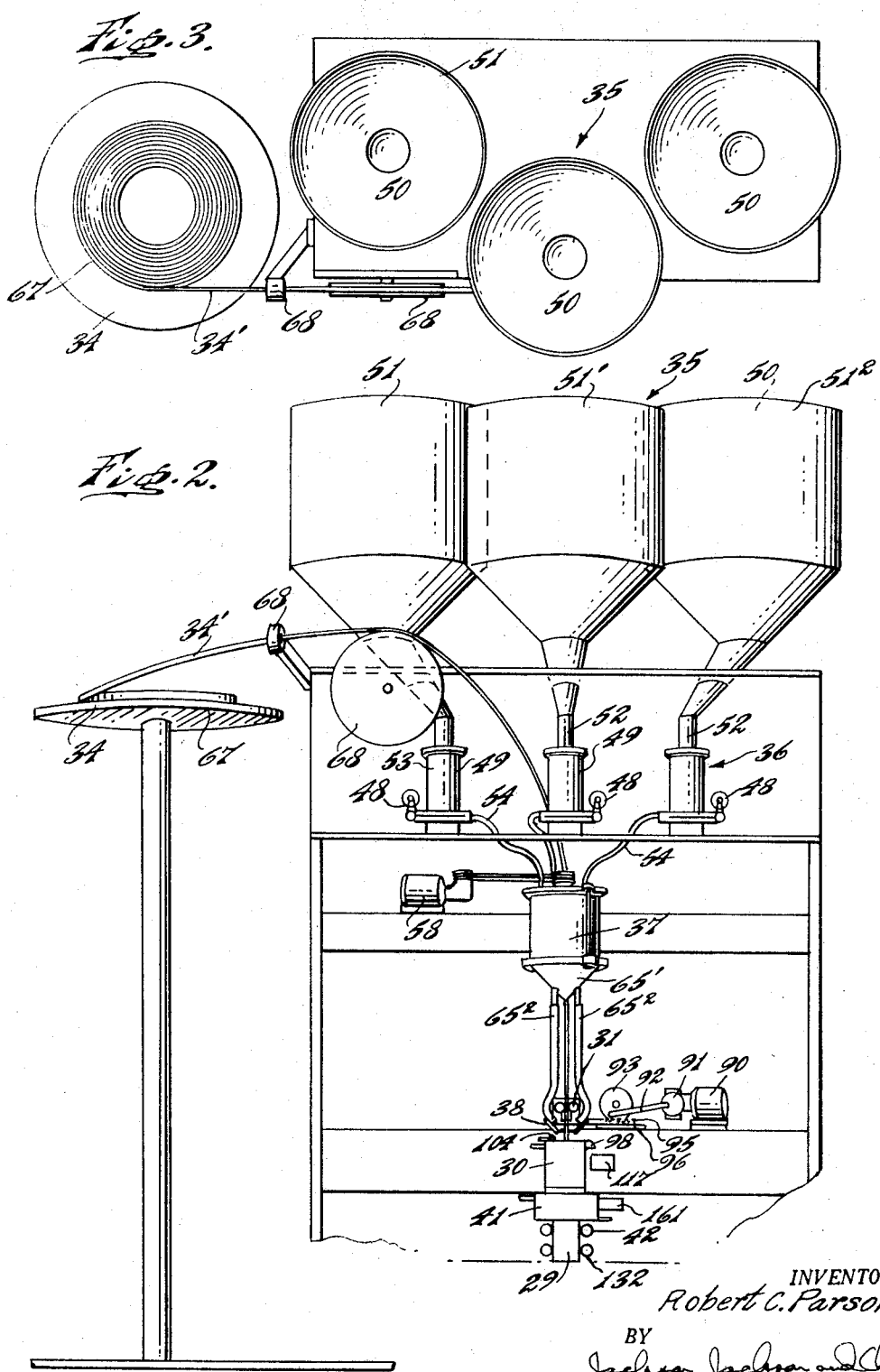

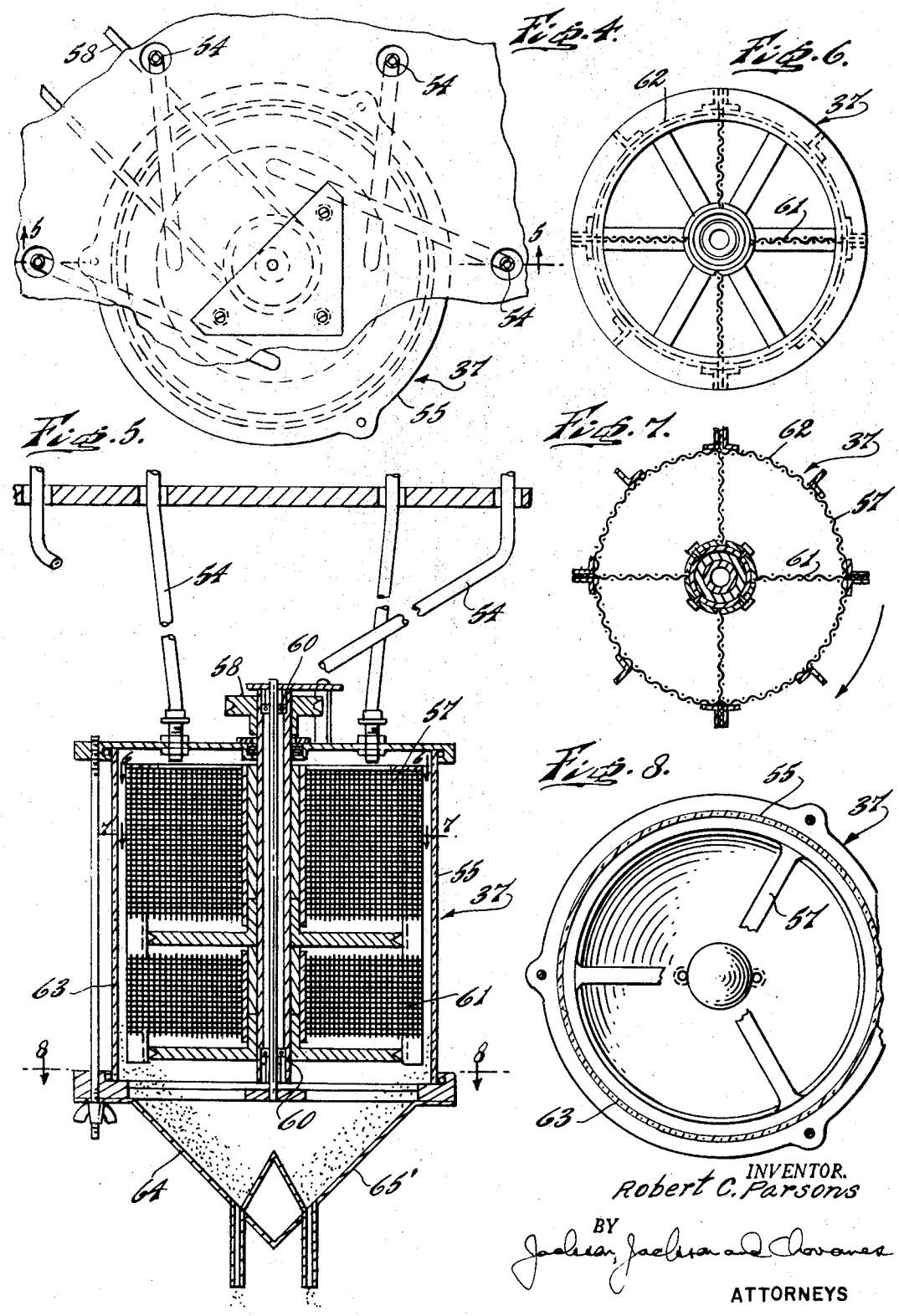

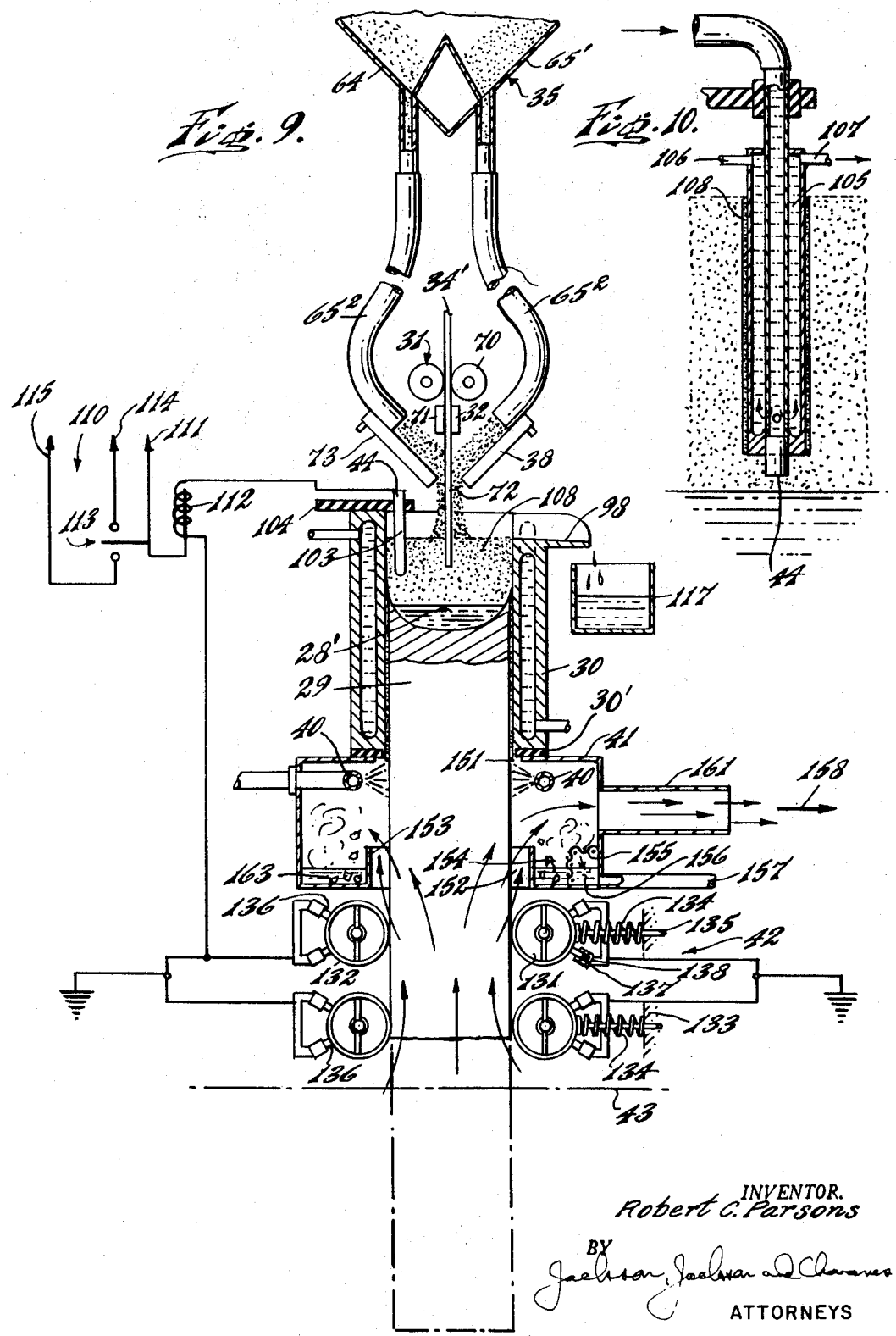

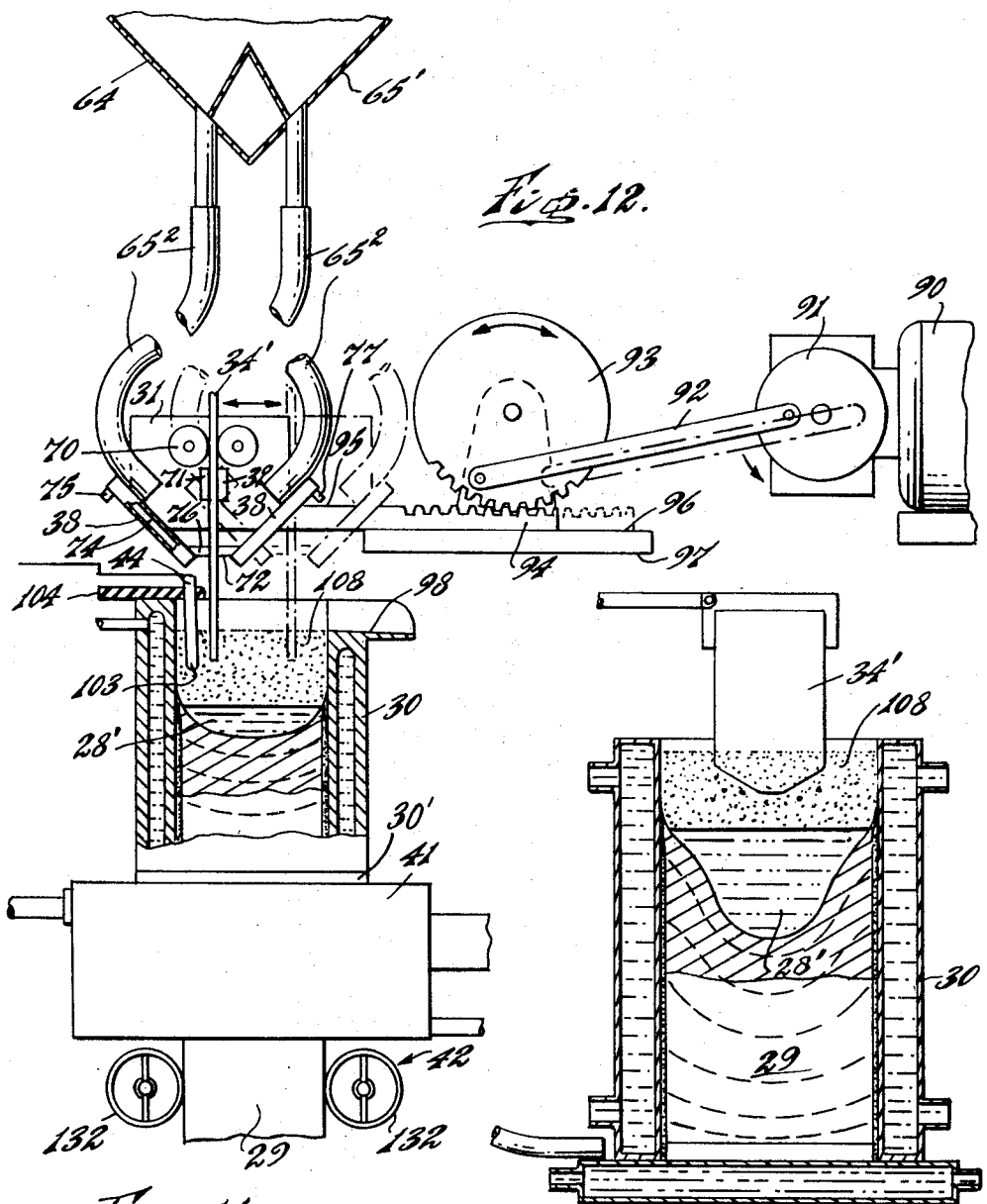
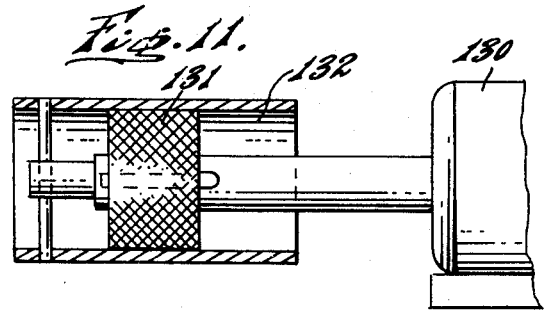

INVENTOR
Robert C. Parsons
BY
ATTORNEYS

United States Patent Office 3,507,968
Patented Apr. 21, 1970

1

3,507,968
ELECTROSLAG MELTING APPARATUS
Robert C. Parsons, Wallingford, Pa., assignor to Arcos Corporation, Philadelphia, Pa., a corporation of Pennsylvania
Original application Dec. 27, 1966, Ser. No. 605,044. Divided and this application Sept. 26, 1968, Ser. No. 762,783
Int. Cl. H05b 7/18, 3/60; C22d 7/00
U.S. Cl. 13—9                                                3 Claims

ABSTRACT OF THE DISCLOSURE

Apparatus for electroslag melting employing a crystallizer to surround molten slag, a molten metal pool and a solidified metal product which is being withdrawn therefrom. In one aspect a crystallizer is electrically insulated from the electrode and from the ground. In another aspect a crystallizer of minimal length is used, to permit direct application of water spray to the solidified metal product below the crystallizer in order to remove slag and produce a nearly vertical dendritic pattern. In another aspect the electrode is traversed in a rectangular crystallizer to form a heat pattern of large cross section and refine the metal most effectively.

In another aspect a mixture of combined powders of controlled composition is fed to the slag pool adhering to the electrode. Steam and slag particles are preferably collected below the crystallizer so that they will not interfere with electrically conducting feed rollers engaging the solidified metal product. The invention contemplates that the slag level can be automatically controlled. The mixing of the powders is best accomplished by a rotary chop mixer.

The present application is a division of my co-pending application Ser. No. 605,044, filed Dec. 27, 1966 for Electroslag Melting Process.

The present invention relates to electroslag melting especially to produce solidified metal products which for convenience are designated ingots, although they may in the particular case be more appropriately called slabs, blooms, slugs, billets, or bars.

A purpose of the invention is to accomplish electroslag melting in a crystallizer of electrically conducting material which is electrically insulated both from the electrode and from ground, thus reducing the power requirements, aiding in nearly vertical solidification and increasing the life of the crystallizer.

A further purpose is to use a liquid cooled crystallizer of minimal length, followed by a water spray on the hot emerging ingot surface immediately below the crystallizer to promote vertical directional cooling in the ingot and to remove slag from the surface of the ingot.

A further purpose is to traverse a strip electrode in the crystallizer so as to maintain a heat pattern of large cross section notwithstanding that the electrode is of small section, so that small droplets of molten metal from the electrode will pass through a chemically active slag under conditions which expose a relatively large surface of molten metal for refining by the slag, thus removing impurities (such as sulphur and phosphorus in ferrous alloys) from molten metal.

A further purpose is to traverse a thin flat strip electrode in a rectangular (including square) liquid cooled crystallizer in the direction of the thickness of the electrode and toward and away from ends of the crystallizer so as to obtain nearly vertical dendritic orientation and

2 effective removal of inclusions as the ingot is deposited, avoiding macrosegregation.

A further purpose is to meter powdered metal and powdered non-metal flux ingredients into a mixer, to form the ingredients into a homogeneous mixture in the mixer and to deposit these ingredients in a pool of molten slag, preferably by making them adhere to the strip electrode and feeding them with the strip electrode.

A further purpose is to carry into a collector, particles of slag removed from the ingot by a cooling medium such as water spray along with steam evolved by the ingot and surplus water, to draw off steam by a vacuum exhaust from the collector, to deposit particles of slag in the collector and to remove excess water from the collector, at the same time sucking in air around a lower space between the collector and the ingot to dry the ingot.

A further purpose is to regulate the metal solidification level automatically to prevent run-outs.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a perspective of the mechanism of the invention, viewed from the front.

FIGURE 2 is a perspective of the mechanism of FIGURE 1 viewed from the rear.

FIGURE 3 is a top plan view of the mechanism shown in the FIGURES 1 and 2.

FIGURE 4 is an enlarged top plan view of the mixer shown in FIGURES 1 to 3 inclusive, sectioned through the feeding tubes and partially broken to show the internal construction.

FIGURE 5 is a section of FIGURE 4 on the line 5—5.

FIGURE 6 is a section of FIGURE 5 on the line 6—6, omitting the housing.

FIGURE 7 is a section of FIGURE 5 on the line 7—7, omitting the housing.

FIGURE 8 is a section of FIGURE 5 on the line 8—8, including the housing.

FIGURE 9 is an enlarged fragmentary diagrammatic axial section of the mechanism from the bottom of the mixer through the powder feeding trough, the crystallizer, the ingot, the collector, the grounding connections and the air blowers.

FIGURE 10 is a fragmentary vertical section of a modification of FIGURE 9 showing a changed construction for the mechanism for sensing the slag level.

FIGURE 10a is a modified vertical section and diagram for a slag level control sensing the crystallizer temperature.

FIGURE 11 is an enlarged fragmentary axial section through one of the ingot retracting and electrical grounding rolls.

FIGURE 12 is a diagrammatic axial section through the crystallizer and the electrode looking in the direction such that the thickness of the electrode lies in the plane of the paper, and showing mechanism for traversing the electrode.

FIGURE 13 is a vertical sectional illustration of the prior art showing isothermal lines for comparison with those shown in FIGURE 12.

In the drawings like numerals refer to like parts throughout.

Figure 17:
FIGURE 17 is a photograph similar to FIGURE 16 showing an ingot otherwise produced in the same manner except that no water spray was used and slag remains adhering to the surface of the ingot.

The continuous electrode herein referred to embodies an invention of Jean Sunnen, U.S. Patent 3,344,839, for Process and Mechanism for Obtaining a Metallic Mass by Fusion, which employs strip electrodes surrounded by magnetically or mechanically held powders as well as electrodes made entirely from compacted metal powders premised to the desired composition of the resultant ingot. The present application involves in several aspects improvements over this Sunnen patent.

British Patent 965,426 of Renault for Improvements in and Relating to the Continuous-Casting of Metals relates to a water cooled crystallizer which surrounds a pool of molten slag, a pool of molten metal beneath it and an ingot being progressively withdrawn from the bottom of the crystallizer and shows a slag notch for removing excess molten slag.

Hopkins U.S. Patents 2,369,233 and 3,067,473 relate to an earlier version of an electrode device to produce ingots. Hopkins U.S. Patent 2,369,233 employs a sleeve to hold a slag, which sleeve is very cumbersome and difficult to manipulate, and which I find to be wholly unnecessary. Numerous features of the present invention represent distinct improvements over the Hopkins device as explained below. Hopkins U.S. Patent 3,067,473 provides a freezing pattern of a character which leads to segregation and poor dendritic orientation as the length of the ingot increases, and the disadvantages of which are explained more fully below.

Very high quality metallic alloys can only be prevented from macrosegregation and large accumulation of non-metallic inclusions if the solidification rate and the direction of solidification are closely controlled. An ideal case would be obtained if all of the molten metal solidified at the same instant, with a constant chemical composition throughout, fixing non-metallic inclusions in the dispersed condition which exists when the metals are molten. But when molten metal is poured into a cold metallic ingot mold, the solidification of the ingot progresses slowly from the wall of the ingot mold inwardly. Horizontal dendrites form along isothermal planes, starting at the ingot wall and moving in the direction of cooling, with the highest melting constituents of the molten metal freezing first. Hence, the composition of the solidifying material changes slowly as solidification progresses, the last metal to solidify being the least pure and most productive of segregation.

The resultant ingot is therefore non-uniform in composition and has areas near the center where the macrosegregated material, being the last to solidify, is deficient in alloying elements which have solidified at higher temperatures, while having a great excess of non-metallic inclusions.

Shrinkage of the ingot during cooling causes piping and in some cases the pipes are filled with solute-rich mixture which was the last to solidify. In other cases the pipes are not filled and a large percentage of the top of the ingot is cropped and discarded to be melted again to eliminate the voids.

Many expedients have been tried to overcome these problems of solidification. Exothermic molds have been used. Hot-tops have been applied which keep the top of the ingot molten so that centerline shrinkage cavities can be fed from a molten alloy pool as they form. Molds of pyramidal shape have been employed which contribute to directional cooling from the bottom. None of these devices, however, has prevented macrosegregation although they have decreased or eliminated piping.

Closely controlled directional cooling of cast metal has not been entirely practical until closely controlled melting rate was possible in the form of electrode remelting. In vacuum arc remelting a cast electrode has been melted by the heat of an arc and solidified in a water cooled mold, the whole process being carried out in a vacuum chamber so that the gas content of the metal can be reduced and oxidation of the electrode and of the molten pool can be eliminated.

Electroslag remelting has also been used in which the electrode is remelted under a blanket of molten slag by the electrical resistance heating of the slag which tends to prevent the formation of oxides and nitrides in the metal.

Both of these processes are relatively slow, so that cooling is somewhat directional, progressing from the bottom of the ingot upward. However, as the length of the ingot increases, heat is increasingly removed through the vertical water-cooled walls of the crystallizer rather than through the hot recently solidified ingot. If the ingot diameter is increased, solidification of the center of the ingot will increasingly lag behind solidification of the side walls of the ingot, increasing the possibility of macrosegregation.

As compared with vacuum arc remelting, electroslag remelting has certain advantages and has had limited employment. The equipment for electroslag remelting is less expensive and it requires less maintenance, since no vacuum need be maintained and alternating current may be utilized, eliminating the cost of direct current rectifiers. The slag used in the electroslag process can be a refining slag which will reduce the quantity of undesirable elements such as sulphur and phosphorus in steel and other ferrous alloys, and non-metallic compounds in ferrous or non-ferrous alloys, if the slag is properly compounded. Elements which are lost as gases in the vacuum arc remelting process, such as nitrogen and manganese, are easily controlled at proper levels in electroslag remelting. Problems which require solution include the following:

(1) There is a need for a practical inexpensive continuous electrode which will have the same composition throughout. The prior practice has been to melt and cast the electrodes for vacuum arc remelting, electroslag remelting and other consumable electrode remelting processes. There is also a need for a troublefree method of joining these electrodes to make a continuous electrode. Mechanical joints or prior art welded electrodes have been prone to separate as they approach the molten pool.

(2) In the electroslag remelting process and other consumable electrode remelting processes for making large ingots, electrodes of large cross section have been required in order to properly distribute the heat. The large electrode cross section led to low current densities which caused metal to melt off the electrodes in large droplets, exposing a very limited surface in contact with the chemically active slag. In order to get small droplets from such large electrodes it would require current densities which are prohibitively high.

(3) It has heretofore not been practical to maintain strongly directional solidification in an endless ingot produced at a high enough melting rate to be commercially feasible.

By the present invention, I have overcome these problems so as to produce ingots of very desirable properties.

In order to understand the disclosure more readily, I show in FIGURES 1 to 12 an electroslag melting apparatus according to the invention which comprises a crystallizer 30, motor driven electrode advancing mechanism 31, electrode contact mechanism 32, electrode storage and feeding mechanism 34, powder storage mechanism 35, powder metering and feeding mechanism 36, powder mixing mechanism 37, a powder-strip combining trough 38 for applying the powder to the electrode, ingot water spray mechanism 40, a vapor, water and flux collector 41, ingot withdrawal and electrical contact mechanism 42, ingot cutoff means 43, and mechanism to control the depth of the slag 44.

Individual powders 50 will in a suitable case include alloying ingredient powders such as nickel, molybdenum, ferrochrome, niobium, and the like, metallic deoxidizers such as aluminum, calcium, magnesium, and silicon, and fluxing ingredients, which may in a particular case include fluorides such as fluorspar, and oxides or materials to form oxides in situ. The number of containers for powdered materials will depend upon the number and character of powdered ingredients.

It will be understood, of course, that all of this will be influenced by the composition of the electrode strip. If the electrode strip is mild steel and the alloying ingredients are added entirely from powdered materials, then of course the powder materials must supply all alloy required. In an appropriate case, however, the electrode may be either a wrought metal electrode or a powdered metal compact which contains suitable alloying ingredients and this will change the need for additions.

Powdered materials including powdered metals and powdered fluxing ingredients are stored at a suitable elevated point in bins 51, 51', and 51² and a continuous feeding discharge occurs through a tube 52 to a metering feeder 53 operating at a controllable feeding rate with respect to each other feeder, so that the desired and correct mixture of powdered ingredients is accomplished. In the metering feeder a suitable dry gas such as argon, helium or nitrogen (or air where proper) is added through inlet 49. A suitable vibrator 48, applied to each dry feeder, aids in feeding. The frequency of vibration may be 60 cycles per second or other suitable frequency.

The respective feeders feed through discharge tubes 54 into the top of a housing 55 of a chop type mixer 37. The mixer has a cylindrical housing in which a center rotor 57 turns under the action of a suitable drive 58, the rotor being mounted on journal and thrust bearings 60.

The rotor comprises a series of radial vanes 61 each of which is made of relatively coarse mesh screen larger than the size of any of the particles, preferably of nylon, and at the outer perimeter the vanes are connected to a similar screen rim 62, suitably of cylindrical form and spaced from the cylindrical side wall 63 of the housing.

At the bottom of the housing it is equally divided into two funnel discharges 64 and 65' to polytetrafluoroethylene tubes 65² to respective sides of a trough 38 to be described. The entire powder feeding system may be pressurized by air or gas from the top to aid in aspirating the powders downward. Neutral gases such as argon, helium, or in a proper case nitrogen, may be used to prevent oxidation of the components if necessary.

In operation of the mixer, downwardly flowing streams of powdered material from the various bins are intercepted or chopped off by the vanes 61 of the rotor 57, so that individual slugs of material of a particular kind are deposited into the space between two vanes and as the rotor continues to rotate and the powder continues to fall are swept into contact with the vanes and passed through the screen into successive adjoining compartments in each of which admixture takes place with other slugs of material of different character. Material builds up in the pie-shaped compartments between the vanes and is thrown radially outward by the vanes and passes through the screen in the rim at the same time further admixing until finally a homogeneous mixture of metallic and non-metallic powder components is obtained in the space outside the rim and inside the cylindrical wall of the hopper. This admixed material falls into one of the discharge funnels from which it flows into the trough to be described. Other admixed matter falls into the discharge funnels from the bottom of the rotor.

The strip electrode may be of wrought strip, for example obtained from a rolling mill or it may be of compressed and sintered or unsintered metallic particles. Of course, the composition of the strip will be taken into consideration in determining the nature of the powder which will be fed with it.

A suitable reel 67 which is of electrically insulating material so as not to cause current to flow in an undesired path, is mounted preferably at a high point and individual electrode strips are joined together end to end, preferably by butt resistance welding or flash welding and then grinding off the excess until the dimension of the strip at the weld is the same as the dimension of the strip at other points. Thus the strip can run indefinitely or until it is intended to shut down the plant without interruption of the strip feeding. From the reel the strip suitably pays off through insulating guides 68 to strip motor driven feeding rolls 70 of electrode advancing mechanism 31, which advance the strip downwardly in a manner well known in the art so that it will enter the molten slag pool within the crystallizer. The speed of progression of the strip is controllable and is coordinated with the speed of feed of the powder materials. Adjacent to and suitably below the strip feeding rollers 70 are copper electrical contact pads 71 which make circuit connection for the heating current.

After the strip passes into engagement with the contact elements and while, of course, it is carrying the very heavy electric heating current, it passes through a suitable relatively wide opening 72 in a water-cooled powder feeding trough 38, the powder including adequate magnetic material, suitably ferrochrome of adequate iron content to be magnetic, cobalt, nickel or iron, which adheres to the strip on both sides firmly because of the magnetic attraction by the very heavy electric current. Of course, non-magnetic powders may be held to the electrode by magnetic powders admixed therewith. Magnetic fields suitable to hold the powders to the strip are formed whether alternating or direct current is used.

If preferred, the powder can be made to adhere by compacting it so that it will form adhering layers on both sides of the electrode as explained in the Sunnen patent incorporated herein by reference, but this is not necessary unless substantial magnetic powdered ingredients are absent.

If reliance is made on magnetism to hold the powder on the sides of the electrode, two features are important:

(1) The powder should not be heated above the Curie point before it enters the molten slag. With this purpose in view, the trough 38 is water cooled through passages 74 in its metallic walls receiving water from inlet 75, passing it to the opposed side of the trough through pipe 76 and withdrawing it through outlet 77.

(2) The stick-out of the electrode should be as short as possible so that the electrode will not heat the powder above the Curie point before it reaches the molten slag. This requires location of the trough close to the top of the molten slag.

Incorporating into the mixture iron or some other magnetic material having a high Curie point, greatly increases the ability of the magnetic field to retain the mixed powder on the strip electrode.

The electrode thus enters the molten slag pool and carries with it in predetermined proportion the powdered ingredients whose composition will be discussed more fully later, but which are of homogeneous composition and uniform feed rate throughout the operation unless an intentional change is made. While different proportions may be used, I find that to advantage 30% of the ingot weight may be supplied by the strip, and 70% by the powder.

It will be evident that direct current can be used for the heating current, but alternating current is preferred because it does not require rectifiers and avoids electrolytic action from parasitic currents which may be detrimental to the crystallizer walls, and which may adversely affect the composition of the slag during melting runs of long duration.

As a result of numerous experiments in electroslag melting, I have found that the maximum amount of metal purification occurs from a chemically active slag when the smallest possible droplets of molten metal form at the end of the electrode as it melts under the heating current developed in the slag. These very small droplets expose the maximum surface to the surrounding slag. Each tiny drop is a metal liquid phase which can react with and undergo refining in contact with the slag phase.

It is important, therefore, I find, that the strip be not excessively thick as otherwise this will tend to interfere with the formation of the desired small droplets. In very small installations the strip can be of foil thickness, but in many cases this is not practical because of the heavy currents and the high melt-off rate required. Good results are obtained with strip in the thickness range between 0.005 and 0.125 inch and preferably in the range between 0.010 and 0.080 inch, and most desirably between 0.025 and 0.050 inch. It will be evident also that to get best refining of the powder particles they should be small, suitably below 8 mesh and preferably below 60 mesh per linear inch.

It will be evident, of course, that the permissible thickness of the electrode in order to obtain small droplets and good refining depends on various factors, among which are the quality of the alloy being manufactured, the fluidity of the molten droplet which in turn depends on temperature, the surface tension tending to hold the droplets to the mother electrode, and the magnetostriction or "pinch effect" which tends to accelerate the droplet away from the mother electrode, and of course this depends as do other factors on the current density. Considering practical current densities of the order of 30,000 to 150,000 amperes per square inch, the above thickness ranges are practical.

It will be evident that when a slag of chemically active composition is used, impurities in the molten metal will combine chemically with the active slag before the metal joins the molten metal pool and of course before it can solidify to form the ingot. Thus oxides, sulphides and the like, will be formed which being less dense than the molten metal separate from the metal droplet and join the surrounding slag while the droplet is still descending. The smaller the droplet, the smaller the distance the newly formed compounds must travel to join the slag. The hotter the metallic droplet the less viscous it is, and the more rapidly these lighter compounds can separate from the metal. Furthermore, with increased temperature, the surface tension of the droplet decreases and this aids in separating out non-metallic compounds from the metal of the droplet.

Starting with a relatively thin strip electrode, the current density in the electrode at the point where it is exposed to the molten slag pool should be at a maximum consistent with stable electroslag melting operation. This condition, of course, favors a small electrode cross section, but this is inconsistent with production of an ingot of sizable cross section where large parts are to be forged or otherwise fabricated from the ingot.

Where size permits, increased current and hence melting can be accomplished by the use of multiple electrodes without sacrificing refining action obtained by relatively thin strip electrodes. In other words, instead of increasing the thickness or width in order to carry heavy currents, it will often be desirable to have two or more electrodes fed in tandem array with the width direction of each perpendicular to the direction of traverse, and to traverse on one or more traversing arms.

In order to prevent segregation and centerline shrinkage, a nearly vertical cooling pattern must be promoted. Nearly vertical columnar crystal growth must be encouraged so that slag which is rising from the molten metal pool if it has not already escaped from the metal droplet during its descent to joint the pool will be rejected ahead of the freezing front and not become entrapped in the solid metal. Furthermore, nearly vertical dendrites must be produced in order to keep segregation to a minimum.

In order to accomplish these results, it is very important as later explained not only to cool the metallic walls of the crystallizer as by liquid flowing through it, but also it is important to withdraw heat rapidly from the ingot immediately below the molten metal pool at a point just below the crystallizer. This can best be accomplished by applying a water spray directly to the red hot ingot at that point, as will later be explained.

I find that ideal melting and solidification conditions can be obained by using one or more strips having a ratio of width to thickness of from 20 to 1 to 150 to 1 and typically about 50 to 1 at a current density with maximum range of from 30,000 to 150,000 amperes per square inch, but for best results in the range of 40,000 to 80,000 amperes per square inch. It is important to use this electrode in a rectangular (or square) crystallizer in which the thickness of the electrode is aligned at right angles to two of the rectangle sides and the width is aligned normal to the other two rectangle sides.

It is very desirable to have a strip electrode whose width extends from 40 to 90% across the width of the mold, and is preferably centrally positioned with respect to the widthwise mold sides. It is also important in the preferred embodiment to traverse the electrode back and forth in the direction of the thickness of the strip for a distance of 40 to 90% of the crystallizer length. The frequency of traversing is not critical, but good results have been obtained using 16 cycles per minute and the frequency should exceed 2 per minute. This will give a wide heat pattern notwithstanding that the cross section of the electrode is small.

The traversing is desirably accomplished by a suitable motor drive 90 driving a crank 91 which drives a connecting rod 92 for manipulating a pinion 93 which drives a rack 94 which connects to a carrier 95 which is slidable on guides 96 and supports the electrode feed and the electrode contact mechanism described, suitably being mounted on the base 97.

Thus by using a strip electrode, traversing it in the direction of its thickness and feeding it rapidly, the rate of deposition can be made equivalent to that of a large cross section electrode such as the prior art cast electrodes and a similar heat distribution pattern can be produced. The use of a rectangular heat distribution pattern as thus described, aids in producing rectangular ingots from a rectangular crystallizer. The invention lends itself to producing ingots which are of such high quality that they do not require blooming prior to rolling or other forming.

The dimensions of the crystallizer control the directionality of the cooling pattern. I find that it is very important to use a relatively short vertical extent of crystallizer. From the standpoint of many aspects of the invention, the crystallizer should not exceed 10 inches in vertical depth and preferably should be as short as 5 inches vertically, a good depth for a 4 x 4 inch crystallizer being about 9 inches.

Figure 15:
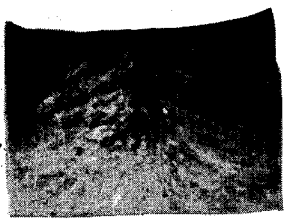
FIGURE 15 is a photomacrograph similar to FIGURE 14 but illustrating a prior art ingot.
Figure 14:
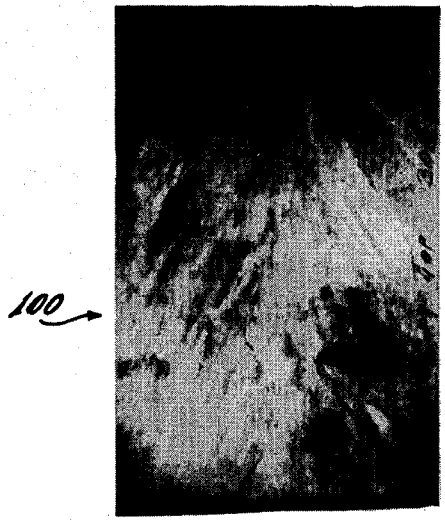
FIGURE 14 is a photomacrograph showing a vertical section of an ingot produced according to the present invention, the size being slightly reduced.

The crystallizer of course has a top which is open to a sufficient extent to allow entry of the electrode with the powder particles adhering to it, so as to carry them beneath the surface of the molten slag pool, and has an open bottom through which the ingot is withdrawn. It preferably has a slag notch 98 at approximately ½ inch below the top and in the preferred operation maintains a slag pool depth of 3½ inches to 4 inches, making the surface of the molten metal not more than 5 inches above the lower or exit end of the crystallizer. When melting at a rate of 2.2 pounds per minute, the axes of the dendrites are at an angle of approximately 30° from the vertical as shown at 100 in the photomacrograph in FIGURE 14. An important aspect in obtaining this nearly vertical dendrite arrangement is the spraying of water from spray nozzles 40 on the ingot just below the crystallizer. I have experimented with the operation of the device, omitting the water spray just below the crystallizer and find that this produces a dendritic structure 102 as shown in FIGURE 15 in which the dendrites are nearly horizontal and very undesirable from the standpoint of trapping inclusions and producing excessive alloy segregation and unfavorable points of weakness.

It will be evident that the molten slag functions as a resistor and of course the deeper the slag and the greater the distance between the electrode and the molten ingot, the higher its electrical resistance will be. This is reflected in the voltage drop from the electrode to the solidified ingot.

It is important that the depth of the molten slag bath be maintained nearly constant so that the heating of the bath will be constant. If the slag bath becomes too shallow, it causes excessive heating of the molten metal pool, causing the pool to deepen and producing a poor metal solidification pattern. Excessive depth of the molten slag bath wastes power, causes excessive heat dissipation through the water-cooled crystallizer and deposits an excessively thick slag skin on the ingot as it forms.

In any case, the slag bath frequently increases in volume more rapidly than the removal of slag by the slag skin on the ingot. At a period of from 2½ to 3 hours after starting operation, the slag pool may deepen to such an extent that a runout of molten metal may occur through the open bottom of the crystallizer and this is highly dangerous to personnel, especially those engaged in operations below the crystallizer, such as cutoff and removal of the ingot.

FIGURE 9 shows a device for controlling the depth of the molten slag pool at an approximately constant level. A tungsten metal rod 103 plunges into the molten slag bath at predetermined point above its bottom and is held in position by a ceramic insulating arm 104 suitably adjacent one corner at the inside of the crystallizer. The tungsten rod extends down to a point slightly above that at which it is desired to maintain the molten-slag molten-metal interface. It is out of the way of the traversing electrode so that it cannot provide a preferred current path for the major melting current which passes from the electrode through the molten slag to the molten metal interface. The upper portion of the tungsten rod is suitably surrounded by a refractory tube which will protect the tungsten rod.

As a means of protecting against heating current in a parallel path flowing through the tungsten rod, an alternative form is shown in FIGURE 10 in which the upper portion surrounding the tungsten rod is water cooled in passages 105 connecting to an inlet 106 and an outlet 107, the water cooling extending to a point near the tip so that a non-conducting slag layer 108 solidifies around the upper portion of the tungsten rod and prevents heating current in a parallel path from flowing through it.

When the molten metal pool rises until it is close to the tungsten rod, the lowered resistance or lowered voltage drop through the slag allows sufficient current to pass in a control circuit 110 from a power source 111 through the tungsten rod 103 and through the ground provided by the ingot to energize a relay 112 to cause it to pick up and shift a switch 113 so as to disconnect from the motor circuit of the ingot removal rolls a slow potentiometer motor control 115, and connect a fast potentiometer motor control 114 so as to withdraw the ingot faster until such time as the resistance or voltage drop changes in order to cause relay 112 to drop and re-establish the slow potentiometer motor control 115, changing the switch position. This process occurs repeatedly and maintains a substantially fixed position for the interface between the molten slag pool and the molten metal pool. As the slag volume increases due to building up of non-metallic products from refining of the molten metal and from additions of powder, the slag level comes above the slag notch 98 and the slag automatically discharges into a slag collector 117.

It is important that the tungsten rod should not be lowered sufficiently to come into contact with the molten metal pool, as tungsten is soluble particularly in ferrous alloys, but is relatively insoluble in the slag.

Since the tungsten probe and the refractory tube deteriorate rapidly in the molten slag, the water-cooled probe is preferable. However, it will be evident that if the water-cooled probe develops a water leak in the probe itself, hazardous conditions may develop from steam exploding under the slag surface.

Surprisingly, it has been found that the location of the solidification level in the crystallizer can be ascertained by measuring the temperature on an outer wall of the crystallizer where a water-cooling chamber is not located.

A commercial surface temperature measuring device such as a thermocouple or preferably a thermistor, placed against the outer wall of the crystallizer, between two of the vertical water-cooling passages, when moved up and down vertically, showed a clearly defined line of demarcation, in which, within about an inch of vertical travel, a temperature variation of 40° F. was observed. Above and below this band of steep temperature gradient, there was a very slight change from equally spaced points. Investigation with a probe showed that the midpoint of this 1 inch band was the location of the top of the molten metal pool.

Based on this observation, a system of thermistors placed at different heights against the outside of the crystillizer was used to "observe" the location of the solidification zone. From the observations made it was possible to deduce two phenomena which are responsible for the sharp temperature gradient at the line of the top of the molten metal pool, which coincide with the line of solidification of the metal. As seen in FIGURE 10a, a slag skin 108' consisting of the highest melting components of the slag pool solidifies on the crystallizer wall slightly above the level where the outer metal skin of the ingot 29 solidifies. This skin increases to about a thickness of ⅟₁₆ inch at the metal solidification level 28 from the molten metal pool 28', and the slag skin is comparatively a poor heat conductor compared to the copper of the crystallizer 30. Slightly further down the crystallizer wall, due to the rapid shrinkage of the solidifying ingot 29, a finite space 164 develops between the slag skin and the crystallizer wall, further reducing the heat transfer to the crystallizer wall. These two effects cause the rapid change in temperature of the outer surface of the crystallizer 30 since the copper is an excellent conductor.

As shown in FIGURE 10a a thermistor 165 is located at the desired point for the solidification zone. This is electrically connected in one arm 166 of a bridge circuit 167 having resistors 168, 170 and 171 in other arms, energized from a suitable current source 172 across bridge points 173 and 174, and indicating unbalance by transmission of a signal to a relay in a control circuit 175 connected from null points 176 and 177 of the bridge. It will be evident that any other suitable pyrometer and control device may be used.

If desired, a separate thermistor or thermocouple with a circuit of FIGURE 10a can control the level of the top of the slag by locating the sensing element on the outside of the crystallizer at the desired height.

The traversing of the electrode over the top of the crystallizer is rapid in the center of its stroke and slow at the ends of its stroke, giving a sine wave motion. The highest temperature is primarily generated opposite the electrode tip where the current density is very high. By sweeping this hot zone back and forth across the horizontal rectangular pool of molten slag, a rectangular heat pattern is established, but more heat is concentrated at the ends of the traversing stroke than at the center. This tends to flatten the top of the molten metal pool. Since, however, heat is being withdrawn at the outside by the crystallizer, it will be evident that the regulation of the length of the traversing stroke, the speed of traversing, and the depth of penetration of the electrode into the slag pool as well as the total depth of the slag pool make it possible to obtain a relatively broad evenly distributed heat area.

When melting and refining stainless steels in the 300 series and utilizing an appropriate slag composition, I find that a traversing speed of about 16 cycles per minute, with a slag depth of about 3.5 inches, an electrode penetration of about 0.5 inch and an electrode feed speed of about 44 inches per minute is preferred.

I have discovered that the most efficient heating of the molten slag pool and the preferred nearly vertical dendrite arrangement are obtained when the liquid-cooled crystallizer is completely electrically insulated from the ground as by insulator 30', FIGURES 9 and 12, so that there is no tendency for heating current to flow through its walls. This is a distinct departure from the prior art. Under these conditions, the inner surface of the crystallizer, which is conveniently of copper in the case of production of ferrous metal alloys, is preserved for a long period of time because of the thin slag layer which forms between the crystallizer and the molten slag pool, the molten metal pool and the ingot. With an electrically insulated crystallizer, the traversing stroke of the electrode can be extended in close proximity to the metallic crystallizer wall since current is not attracted to the wall, and this tends to favor the nearly vertical solidification. With the crystallizer electrically insulated from ground, all heating current travels directly downward to the molten-slag molten-metal interface. Thus, heat is generated along the path of the falling molten metal droplet which has just melted off the bottom of the electrode and this is more effective from the standpoint of refining the droplet than if the heat were being developed in the crystallizer walls.

In the prior art when the crystallizer was grounded, electric power was wasted in developing heat in the periphery of the molten slag pool and at the interface between the molten slag and the crystallizer. Slight arcing occurred at this interface due to the high resistance of the slag and the ease with which gases ionized at the high temperatures which are present. The existence of any small crack in the solidified slag layer at the inside of the crystallizer formed a location for a tiny arc. This tended to melt the recently formed metallic ingot skin at that point, and greatly increased the danger of runouts and the hazard to workmen. Such arcing also tended to pit the interior of the crystallizer and make it unusable after a few hours of operation.

The passage of heating current directly from the tip of the electrode to the molten-slag molten-metal interface causes heat distribution that favors nearly vertical directional cooling. When in the prior art the mold was grounded, that portion of the heating current which passed through the molten-slag crystallizer interface (which was approximately one-third of the heating current) created localized heating at this interface when the traversing electrode approached to a point near the interface. This greatly detracted from the heating effect desired at the outer edges of the molten-slag molten-metal interface and prevented heating the molten metal pool evenly by the traversing electrode. By electrically insulating the crystallizer from ground, more even heat distribution on the surface of the molten metal pool is obtained and when combined with the water spray on the ingot below the crystallizer, causes the desired nearly vertical dendritic structure, even distribution of solute, and freedom from segregation.

It will be evident that when using a very short crystallizer and water spray on the ingot just below the crystallizer, the rate of withdrawal of the ingot is related to the cleanness of the metal obtained. Using a crystallizer not longer than 10 inches and preferably as short as 5 inches, with a rate of vertical withdrawal of ¼ inch per minute, and a 4 x 4 inch interior horizontal cross section of the crystallizer, metals of very exceptional cleanliness can be obtained. The rate of vertical ingot withdrawal can be increased to ⅝ inch per minute and cleanness can be obtained equal to the best vacuum arc melting methods and the cleanness is far superior to these products when cast into static molds.

One great advantage of the electroslag remelting process according to the present invention is that the ingot emerging from the bottom of the crystallizer has the exact dimensions required for a billet to be subsequently rolled or forged. This is true because no surface conditioning is required and because the nearly vertical dendrite distribution permits direct hot rolling to final finished size without intermediate blooming.

One great advantage of the present invention exists in hot rolling stainless steels of the chromium nickel type which have ferrite contents in the range of 10 to 25% as cast. Prior art practice makes it impossible to hot roll such stainless steels directly (without hammer forging or cogging) without corner checking. This is because the prior art grain growth nearly transverse to the axis of the ingot produces striations of ferrite in cast stringers. In the prior art corner checking occurs parallel to the long axes of the grains which are perpendicular to the axis of the ingot. The nearly vertical dendritic solidification in the present invention makes it possible to roll an ingot of such stainless steels down for example to a quater inch hot rod in one rolling operation without corner checking. This was done successfully in ingot 16576, for example.

EXAMPLE 1

The following is an example relating to the production of ingots 16562 to 16562-3 of an alloy steel having the following nominal composition:

| | Percent by weight |
|---|---|
| Carbon | 0.02 |
| Manganese | 2.0 |
| Chromium | 22.0 |
| Nickel | 10.0 |
| Iron | Balance |

Five storage reservoirs for powders and five powders were used as follows:

*No. 1 feeder.*—A mixture of manganese and iron containing 10.5% manganese and 89.5% iron by weight fed at the rate of 221 grams per minute to feed in a minute 23 grams of manganese and 198 grams of iron.

*No. 2 feeder.*—Feeding ferrochromium which was 73.8% chromium and 25.1% iron (balance principally silicon and carbon).

*No. 3 feeder.*—Feeding the same composition ferrochromium.

The combined feed rate of No. 2 and No. 3 feeders is 218 grams of chromium and 74 grams of iron per minute.

*No. 4 feeder.*—This feeds 99.9% by weight pure nickel at the rate of 102 grams of nickel per minute.

*No. 5 feeder.*—This feeds 8 grams per minute of a suitable deoxidizer such as titanium or vanadium.

The electrode feeder deposited 377 grams of iron per minute.

The flux ingredients fed dry used in this experiment had the following composition by weight:

| | Percent |
|---|---|
| Calcium fluoride | 42 |
| Alumina | 26 |
| Lime | 24 |
| Silica | 8 |

These flux ingredients were dried for two hours at 1150° F. prior to use and stored in an air-tight container until they were fed.

The electrode voltage to ground was maintained between 54 and 57 volts, alternating current. The current level was maintained between 1450 and 1480 amperes.

The crystallizer inside space was 4 x 4 inches, the corners being rounded on half inch radii. The crystallizer was 9 inches tall and had three water cooling passages in each wall.

The temperature at the top of the slag bath during operation was maintained between 3350° and 3450° F. The cross section of the mild steel electrode was 0.035 by 1.5 inches.

The composition of ingots obtained is shown by Table 1.

It is important to obtain a superior surface on the ingot, not only for the quality of the product for purposes of rerolling but also in order to remove the slag from the surface and obtain good electrical grounding connection.

Figure 16:
FIGURE 16 illustrates photographically to slightly reduced scale the side of an ingot of the invention made by employing the water spray to aid in removing slag and obtaining a clean ingot surface for the purpose of electrical grounding.

FIG. 17 shows the surface obtained from an ingot produced by the process of the invention without the water spray below the crystallizer, indicating that a large amount of slag has not been removed and has become embedded in a surface roughened by small run-outs, while FIGURE 16 shows the result obtained with the water spray immediately below the crystallizer. The improved surface is believed to be obtained particularly from the water spray, which by its rapid cooling produces a thick ingot skin not susceptible to run-outs, and from the insulated crystallizer which prevents localized arcs and consequent localized ingot skin breakdown.

The rapid cooling and rapid contraction under the impinging water jets reduce the slag to small particles carried by the water and by the steam, the slag removal being almost explosive. It is believed that the formation of steam aids in the instant slag removal. A very clean surface results which contributes greatly to the economy of the process since ingot conditioning is not required. Conditioning is not only costly from a standpoint of labor, but also is likely to waste 3 to 5% of the weight of the ingot.

Due to the fact that the surface is very perfect and the slag has been removed, a continuous rolling ground contact is obtained. This avoids the necessity of applying and moving ground clamps which are troublesome and expensive. Two sets of ground clamps were formerly used and one set had to be released and moved while the other remained in place. Furthermore, the fixed location of the ground clamp on the ingot increased the resistance of the current path as the ingot advanced. The increase in electrical path with the ground clamps was particularly noticeable in stainless steels of poor electrical conductivity. In the present invention drive-motors 130 drive extractor rolls 131 which carry with them copper sleeves 132. One set of rolls and contact sleeves is axially fixed and the others are spring pressed from spring abutments 133 by spiral compression springs 134, and plungers 135 toward the opposite set of rolls gripping the ingot under a pressure of the order of 700 pounds.

The ground contact to the rotating copper sleeves is made by brushes 136 urged by springs 137 from abutments 138 on the frame and electrically connected to ground by cables.

Around the space above the ground connecting sleeves is placed a collector 41 which surrounds the ingot, relatively close to the ingot at 151 at the top and spaced from the ingot to provide an air space 152 between the collector and the ingot at the bottom. The collector has at the inside a lip 153 adjoining the ingot and around it has in the bottom a slag collecting tray 154 which communicates at the outside through a screen 155 with a water channel 156 drained by a hose 157. Vacuum from a blower 158 is provided through a flue connecting to the upper outside portion of the collector and this creates such a tremendous suction that air is constantly drawn in at the space 152 around the ingot inside the collector to dry the ingot issuing from the bottom of the collector, and steam and entrained water are expelled through the flue 161, while water is removed from the hose connection 157 and finely divided slag 163 is periodically removed from the tray 154. It is important to keep the water from flowing down on the copper grounding sleeves as it may interfere with electrical grounding and with the cutting operation.

Under the device of the invention, with the clean surface of the ingot and the effective slag removal and the dry condition of the ingot, a single copper sleeve will effectively carry up to 600 amperes of heating current on a 3 inch line contact, as in the example above.

It will be evident that the process of the invention will melt metallic strip and powders in predetermined admixture under a molten slag continuously and will form an ingot which solidifies substantially vertically and is free from macrosegregation and has only small dispersed non-metallic inclusions. Until the present invention, all commercial consumable electrode remelting has been performed in large water cooled stationary molds using large precast electrodes. In such a process the vertically oriented dendritic pattern is obtained only from the bottom in the lower face of the ingot due to the effect of the water-cooled stool, but as the metal rises the effect of the water-cooled stool on the direction of cooling decreases and this is particularly true with stainless steel alloys which are of poor heat conductivity.

FIGURE 13 shows isotherms in such prior art equipment at various stages during the formation of the ingot. Solidification takes place on a front along these isotherms and the long axes of the dendrites whose points lie along the topmost isotherm are perpendicular to that isotherm. Hence the long axes of the dendrites which form in the outer area of the upper parts of a static cast electroslag remelted ingot are at about 60° with the long axis of the ingot. The center of the molten metal pool becomes steadily deeper as solidification proceeds up the ingot and there is more opportunity for segregation to occur there especially if the melting takes place at a fast rate. The character of this prior art equipment precludes the formation of nearly vertically oriented dendrites in any but the very lower part of the ingot.

Compared to FIGURE 13 the present invention as shown in FIGURE 12 provides a combination of strong cooling of recently formed metal by the water spray a short distance below the molten metal pool along with controlled heat dissipation in a deep slag pool above the molten metal pool due to the traversing of the strip electrode. Thus, there is a flattened isothermal front along which solidification occurs. The resultant dendrites are nearly vertical and all sections of the solidifying ingot top are fed with solute of the same composition. This uniformity of solute composition is enhanced by the stirring effect of the widthwise traversing electrode moving through the molten slag pool plus the strong electrodynamic action which stirs the molten slag and molten metal due to the passage of heavy electric currents through it. The nearly vertical dendritic formation and the elimination of segregation are aided by electrically insulating the metallic crystallizer which prevents diversion of about one-third of the current to the crystallizer slag-pool interface.

In view of my invention and disclosure, variations and modifications to meet individual whim or particular need will doubtless become evident to others skilled in the art to obtain all or part of the benefits of my invention without copying the apparatus shown, and I, therefore, claim all such insofar as they fall within the reasonable spirit and scope of my claims.

3,507,968

TABLE 1.—INGOT COMPOSITION DISTANCE FROM START

| Elements | Computed electrode composition | 3 inches | | 63 inches | | 115 inches | | 175 inches | | 235 inches | |
|---|---|---|---|---|---|---|---|---|---|---|---|
| | | Edge | Center | Edge | Center | Edge | Center | Edge | Center | Edge | Center |
| C | 0.026 | 0.039 | 0.041 | 0.025 | 0.021 | 0.021 | 0.021 | 0.027 | 0.023 | 0.025 | 0.025 |
| Mn | 2.2 | 1.83 | 1.92 | 2.03 | 2.02 | 2.00 | 1.99 | 2.01 | 1.87 | 2.07 | 1.97 |
| Si | 0.53 | 0.17 | 0.17 | 0.20 | 0.20 | 0.17 | 0.20 | 0.133 | 0.144 | 0.165 | 0.207 |
| S | 0.013 | 0.006 | 0.008 | 0.009 | 0.008 | 0.008 | 0.008 | 0.012 | 0.013 | 0.012 | 0.012 |
| P | 0.012 | 0.004 | 0.004 | 0.005 | 0.004 | 0.003 | 0.005 | 0.001 | 0.002 | 0.002 | 0.002 |
| Cr | 21.8 | 21.37 | 21.59 | 22.09 | 21.46 | 22.18 | 21.68 | 21.26 | 20.25 | 21.32 | 21.30 |
| Av. Cr | 21.8 | 21.45 | | 21.77 | | 21.93 | | 20.75 | | 21.31 | |
| Ni | 10.2 | 10.02 | 10.16 | 9.90 | 9.98 | 10.16 | 10.04 | 10.00 | 9.53 | 9.54 | 9.42 |
| Av. Ni | 10.2 | 10.09 | | 9.94 | | 10.10 | | 9.76 | | 9.48 | |
| Ca | | 0.006 | | 0.006 | | 0.006 | | | | | |

Having thus described my invention what I claim as new and desire to secure by Letters Patent is:

1. In apparatus for electroslag melting, a horizontal metallic crystallizer having an open top and a open bottom and having metallic side walls exposed to molten metal and adapted to surround an ingot, there being cooling passages in the crystallizer, connections for passing a cooling medium through the cooling passages in the crystallizer to cause the ingot to solidify, an electrode entering the space within the crystallizer, means for withdrawing the ingot from the bottom of the crystallizer, an electrode feed projecting the electrode into the space within the crystallizer, there being within the crystallizer and surrounding the electrode a pool of molten slag, below it a pool of molten metal, below it the ingot formed by solidification of the molten metal and a layer of solidified slag around the outside of the ingot, an electrical connection to the electrode, an electrical connection to the ingot below the crystallizer, electric heating current connections between the electrical connection to the electrode and the electrical connection to the ingot for passing heating current through the slag, and an electrically insulating mounting for the crystallizer insulating the crystallizer from ground, whereby the heating current does not flow through the crystallizer, an unimpaired layer of slag forms around the ingot to reduce the danger of runouts, and the crystallizer is protected against electric arcing.

2. Apparatus of claim 1, in combination with water sprays directed on the heating ingot where the solidified slag is present for removing the solidified slag below the crystallizer, the electrical connection to the ingot being located below the water sprays.

3. Apparatus of claim 1, in which the cross section of the electrode is wider than it is thick, a feeder for a stream of powder at least some of which is metallic powder having a Curie temperature and having magnetic properties below that temperature, a trough receiving the stream of powder through which the electrode passes in contact with the powder, and connections for passing a cooling medium through the cooling passages in the trough, whereby the metallic particles retain their magnetism and adhere to the electrode and are brought by the electrode beneath the pool of molten slag.

References Cited

UNITED STATES PATENTS

| | | | |
|---|---|---|---|
| 3,046,320 | 7/1962 | Gassen | 13—31 |
| 3,226,223 | 12/1965 | Bussard et al. | 75—10 |
| 3,234,608 | 2/1966 | Peras | 75—10 X |
| 3,342,250 | 9/1967 | Treppschuh | 75—10 X |
| 3,291,955 | 12/1966 | Shrubsall-Gilson | 219—73 |

OTHER REFERENCES

Paton, B. E., Electroslag Welding, 2nd ed., 1962, Reinhold, New York, pp. 47 and 105.

H. B. GILSON, Primary Examiner

U.S. Cl. X.R.

75—10